(12) United States Patent
Dattner

(10) Patent No.: US 10,801,697 B2
(45) Date of Patent: Oct. 13, 2020

(54) BROADBAND LIGHT SOURCE MODULE COMBINING SPECTRUMS OF DIFFERENT TYPES OF LIGHT SOURCES

(71) Applicant: Luxmux Technology Corporation, Calgary (CA)

(72) Inventor: Yonathan Dattner, Calgary (CA)

(73) Assignee: Luxmux Technology Corporation, Calgary (CA)

( * ) Notice: Subject to any disclaimer, the term of this patent is extended or adjusted under 35 U.S.C. 154(b) by 158 days.

(21) Appl. No.: 16/195,962

(22) Filed: Nov. 20, 2018

(65) Prior Publication Data
US 2020/0158312 A1   May 21, 2020

(51) Int. Cl.
*F21V 7/22* (2018.01)
*F21V 8/00* (2006.01)
(Continued)

(52) U.S. Cl.
CPC .................. *F21V 7/22* (2013.01); *F21V 5/04* (2013.01); *F21V 23/003* (2013.01);
(Continued)

(58) Field of Classification Search
CPC  G02B 27/141; G02B 27/1006; G02B 27/145; G02B 27/142; G02B 19/0028;
(Continued)

(56) References Cited

U.S. PATENT DOCUMENTS

2004/0179359 A1\* 9/2004 Miyawaki ............... H01L 33/60
362/230
2011/0109820 A1\* 5/2011 Silverstein ........... H04N 9/3161
349/8
(Continued)

OTHER PUBLICATIONS

Orly Yadid-Pecht, Yonathan Dattner, "Broadband SLED-based light source (BeST-SLED™) and spectrometer," Proc. SPIE 9751, Smart Photonic and Optoelectronic Integrated Circuits XVIII, 975101 (Mar. 3, 2016) (Year: 2016).\*
(Continued)

*Primary Examiner* — William R Alexander
*Assistant Examiner* — Sharrief I Broome
(74) *Attorney, Agent, or Firm* — ATMAC Patent Services Ltd.; Andrew T. MacMillan

(57) ABSTRACT

A wideband light source includes multiple light sources enclosed within a butterfly package. The butterfly package includes light sources of different types such as a plurality of SLEDs and a plurality of laser diodes. Other types of broadband and narrow band light sources may be included on the same butterfly package in a similar manner. The emitted light from each light source is collimated via a collimating lens and directed towards an optical fiber using a mirror. Each light source produces light in a different spectral range, and the collimated beams from the various light sources are combined into a joined broadband beam by a plurality of corresponding dichroic mirrors. The broadband beam is coupled into a single mode or polarization maintaining fiber which serves as the optical output from the butterfly package. A processor monitors the power output of each light source drives each light source to ensure stability.

20 Claims, 12 Drawing Sheets

(51) Int. Cl.
*F21V 5/04* (2006.01)
*F21V 29/54* (2015.01)
*F21V 23/00* (2015.01)
*F21V 23/04* (2006.01)
*F21V 29/503* (2015.01)
*F21Y 115/10* (2016.01)
*F21Y 113/13* (2016.01)
*F21Y 115/30* (2016.01)

(52) U.S. Cl.
CPC ........ *F21V 23/0457* (2013.01); *F21V 29/503* (2015.01); *F21V 29/54* (2015.01); *G02B 6/0006* (2013.01); *F21Y 2113/13* (2016.08); *F21Y 2115/10* (2016.08); *F21Y 2115/30* (2016.08)

(58) Field of Classification Search
CPC .. G02B 27/14; G02B 26/008; G02B 27/1013; G02B 5/208; G02B 5/26; G02B 19/0057; G02B 21/06; G02B 27/102; G02B 27/1073; G02B 5/18; G02B 5/201; G02B 6/4215; G02B 27/0905; G02B 27/30; G02B 7/006; H01S 5/4012; H01S 5/141; H01S 5/4087; H01S 3/09415; H01S 5/4062; H01S 3/094053; H01S 3/2383; H01S 5/005; H01S 2301/03; H01S 3/005; H01S 3/08; H01S 3/08059; H01S 3/09408; H01S 3/0941; H01S 3/2391; H01S 5/0057; H01S 5/0078; H01S 5/02248; H01S 5/02284; H01S 5/405; G03B 21/204; G03B 33/12; G03B 21/2033; G03B 21/2066; G03B 21/20; G03B 21/2013; G03B 21/008; G03B 21/14; G03B 21/208; G03B 21/28; G03B 11/00; G03B 15/03; G03B 21/005; G03B 21/006; G03B 21/2073; G03B 27/14; G03B 33/08; G03B 33/10; G03B 35/08
See application file for complete search history.

(56) References Cited

U.S. PATENT DOCUMENTS

| | | |
|---|---|---|
| 2013/0321816 A1 | 12/2013 | Dattner et al. |
| 2014/0086539 A1* | 3/2014 | Goutain .............. H01S 5/34333 385/89 |
| 2016/0230958 A1* | 8/2016 | Pickard ................... F21V 7/04 |
| 2017/0307167 A1* | 10/2017 | Hadrath ................ F21S 41/321 |

OTHER PUBLICATIONS

Luxmux, "BeST-SLED Bands", Brochure distributed at SPEI conference starting on Feb. 13, 2016.
Luxmux, "BeST-SLED Tunable", Brochure distributed at SPEI conference starting on Feb. 13, 2016.
Luxmux, "A silicon Nano-Photonic based FTIR spectrometer and applications in the oil and gas industry", slides from presentation to UofC Nanogroup on Nov. 18, 2015.
Luxmux, "Luxmux Presents the BeST-SLED Spectrometer", slides from presentation given in 2016.
Luxmux, "Broadband SLED-based light source (BeST-SLED™) and Spectrometer", paper presented at SPEI conference starting on Feb. 13, 2016.
Luxmux, "Broad Spectrum Tunable Superluminescent Diode Light Source", brochure dated Apr. 16, 2018.

* cited by examiner

BROADBAND LIGHT SOURCE MODULE COMBINING SPECTRUMS OF DIFFERENT TYPES OF LIGHT SOURCES

BACKGROUND OF THE INVENTION

(1) Field of the Invention

The invention pertains to broadband light sources. More particularly the invention pertains to miniature light sources in the form of a pigtailed butterfly package.

(2) Description of the Related Art

Light sources are an important component in many applications across a wide range of industries. These applications include but are not limited too spectroscopy, biomedical imaging, sensing, scientific and research and much more. In the past the common light sources would include DC ARC and incandescent lamps, recently light emitting diodes (LEDs), superluminescent diode (SLEDs), LASER diodes and supercontinuum light sources have appeared. The modern incandescent lamp is a descendant from Edison's lamps and as such a classical illumination solution that works by mimicking black body radiation, it heats a wire filament which emits light as a result. An incandescent lamp that uses a Tungsten filament heated to 3,000K covers a spectrum from 320 to 2500 nm and in addition it has a smooth spectrum. However, since the power is distributed over such a large spectral range the power density is low, moreover since the filament is relatively large and it emits light in all directions it is impossible to generate a diffraction limited beam by effectively using a filament lamp. The DC ARC lamps use different gasses such as Xenon, Mercury, Hydrogen, Deuterium (or other) to generate light, as a result their spectrum varies. Generally, an ARC lamp offers a wide, non-smooth spectrum with some distinctive spikes. It has superior power in comparison to an incandescent lamp, but as before, the ARC's spectral density is low and it cannot be properly collimated. The LEDs, SLEDs and laser diodes solutions currently available can generate a diffraction limited beam but offer either very limited spectral range (typically up to 30 nm for LEDs, up to 100 nm for SLEDs and up to 3 nm for laser diodes) or spectral density. The supercontinuum light source offers a collimated beam with high power and wide spectral range. However, these light sources are expensive in comparison to previously mentioned alternatives and do not provide stable output power.

BRIEF SUMMARY OF THE INVENTION

According to an exemplary embodiment of the invention there is disclosed a small footprint, low power, cost effective, single mode fiber coupled broadband light source. It is based on using multiple light sources spectrally combined into a diffraction limited beam. Its design is compact 32-pin butterfly package and enables combining any desired number of light sources in a single package. Any combination of LEDs, laser diodes, SLED's and/or other light source types can be incorporated and their spectral ranges combined. For example, a combined beam from 700 nm-1800 nm with a total optical output power reaching the combined SLEDs' and other types of light sources' output power minus losses in any dichroic mirror coatings and single mode fiber coupling. This multiple different light source module can operate at temperatures ranging from −40° C. to 60° C., and resides in a custom designed 32-pin package, only 57 mm by 43 mm by 33 mm large. The optical output is delivered from a polarization maintaining (PM) fiber or single mode fiber with an FC/APC connector at the output.

According to an exemplary embodiment of the invention there is disclosed a small footprint, low power, cost effective, single mode fiber coupled broadband light source comprising a plurality of different light source types with a fiber optic output connector coupled to the light source module. The light source module comprises a plurality of light sources of different types; and each of the light sources emits light with a unique spectrum in a different spectral region. The size of the butterfly package containing the light sources may vary and the number of sources within the optical package may vary. The spectral range of each light source, and as the result the output spectra from the optical package may vary. The light sources are selected such that there is an overlap between each two neighboring spectra to thereby create a continuous spectrum of light spanning across the total spectrum of all light sources. In the wavelengths that overlap between two light sources, the intensity is combined based on each light source's power at that wavelength multiplied by the dichroic mirror transmittance and reflectance characteristics for each wavelength According to an exemplary embodiment of the invention there is disclosed a light source module that comprises multiple SLEDs emitting light; multiple laser diodes emitting light; multiple LEDs emitting light; multiple collimating lenses; single focusing lens; a first dichroic mirror or not dichroic; and multiple dichroic mirrors having a wavelength dependent transmittance and reflectance characteristic based on the desired spectral output. The first light source, the second light source, the first collimating lens, the first mirror, and the second collimating lens and the second mirror are positioned relative to each other such that the first beam of light from the first light source propagates through the first collimating lens and later reflected from the dichroic mirror and directed to the second mirror. The first beam of light enters the second mirror and passes through the second mirror exiting on the other side of the second mirror; and the second beam of light from the second light source propagates through the second collimating lens and is reflected from the second mirror in a same direction that the first beam of light exists the second mirror. The first beam of light and the second beam of light are overlaid and spectrally combined into a single beam that consists of a combination of their wavelength spectra. The third beam of light and every other consecutive beam of light repeats the same behaviour as the second beam of light. Where it is emitted by the corresponding light source, it is being collimated as it propagates through the corresponding collimation lens, and it is reflected from the corresponding mirror in a same direction that the existing beam of light exists the corresponding mirror. In this way, the existing beam of light and the added beam of light are overlaid and combined into a single beam that consists of a combined wavelength spectra.

According to an exemplary embodiment of the invention there is disclosed a light source module that includes a coupling lens located before an output to the fiber optic output connector. A first light source emits a first range of wavelengths, a second light source emits a second range of wavelengths, and each consecutive light source in the optical package emits their corresponding range of wavelength that contributes to the total emission of the optical package. The beams travel through the optical package generating a single output beam until the output beam reaches a coupling lens that couples the beam into the output fiber optic. The light source module may be an optical butterfly package and may or may not include a thermo-electric cooling (TEC) device that is used to dissipate excessive heat that may be generated by the light sources. The light sources and other optical components are attached (though not necessarily directly, but by the use of intermediate holder such as an optical bench) to the TEC. The optical butterfly package may or may not include a polarizer or depolarizer. This optical element would be placed in front of the coupling lens in order to polarize or depolarize the optical beam before it enter the single mode output fiber or the polarization maintaining output fiber.

According to an exemplary embodiment of the invention there is disclosed a light source module that includes a plurality of superluminescent diode (SLED) sources and a plurality of laser diodes, one or more mirrors for combining light emitted from each of the superluminescent diode (SLED) sources and laser diode sources into a combined light beam, and an output connector for transmitting the combined light beam to a fiber optic cable.

An exemplary embodiment presents a cost-effective light source module light source, combining a number of different types of semiconductor light sources into a single light source. In some embodiments, the device offers a light span in the range of nearly 500 nm centering around 1485 nm. The output light is polarized, and the average optical power density is 100 uW/nm out of the fiber optic. Inside the light source module, the output power of each light source can be individually controlled and is individually monitored and feedback is used to ensure a stable output. A processor monitors power intensity using a power meter for each light source and likewise controls the output power of each light source to maintain stability and to change the light intensity and spectral ranges depending on different modes of operation.

These and other advantages and embodiments of the present invention will no doubt become apparent to those of ordinary skill in the art after reading the following detailed description of the preferred embodiment that is illustrated in the various figures and drawings.

BRIEF DESCRIPTION OF THE DRAWINGS

The invention will be described in greater detail with reference to the accompanying drawings which represent preferred embodiments thereof.

DETAILED DESCRIPTION

Figure 1:
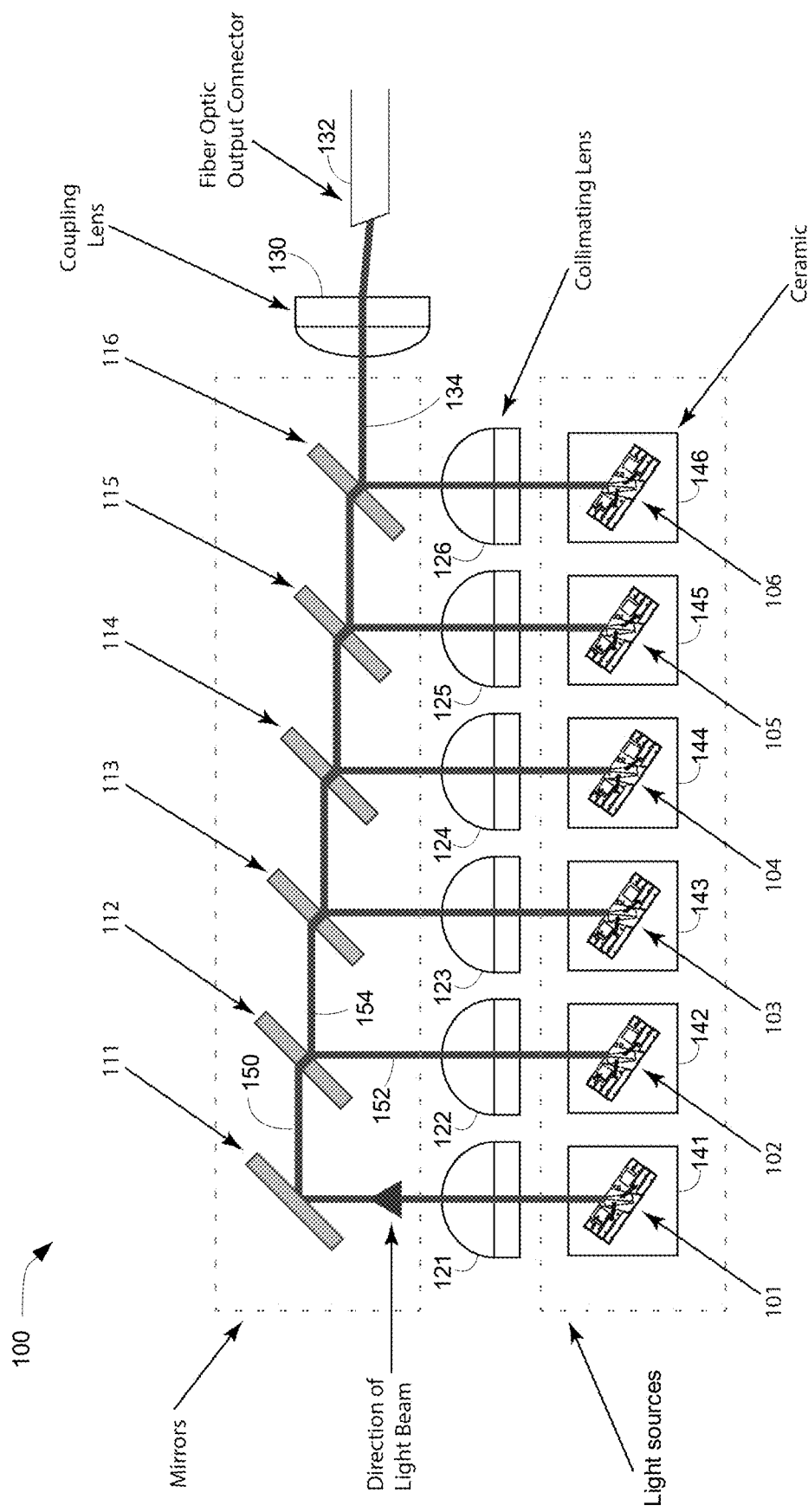
FIG. 1 shows a schematic simplified arrangement of light sources within a light source module according to an exemplary embodiment.

FIG. 1 shows a schematic arrangement of a light source module 100 having a plurality of light sources 101-106 according to an exemplary embodiment. In this configuration, each light source is one of a superluminescent diode (SLED), a laser diode, a light emitting diode (LED), and/or another type of semiconductor light source. Each light source 101-106 is seated within its own ceramic block 141-146 and has a respective collimating lens 121-126 and mirror 111-116. The light source module 100 further includes a coupling lens 130 directing a combined beam of light 132 into an output fiber optic 134. The output fiber optic 132 is a single mode or polarization maintaining fiber optic. The direction of the light beam emitted by the light sources 101-106 is from the light source 101-106 to the mirrors 111-116 as shown in the figure.

Figure 2:
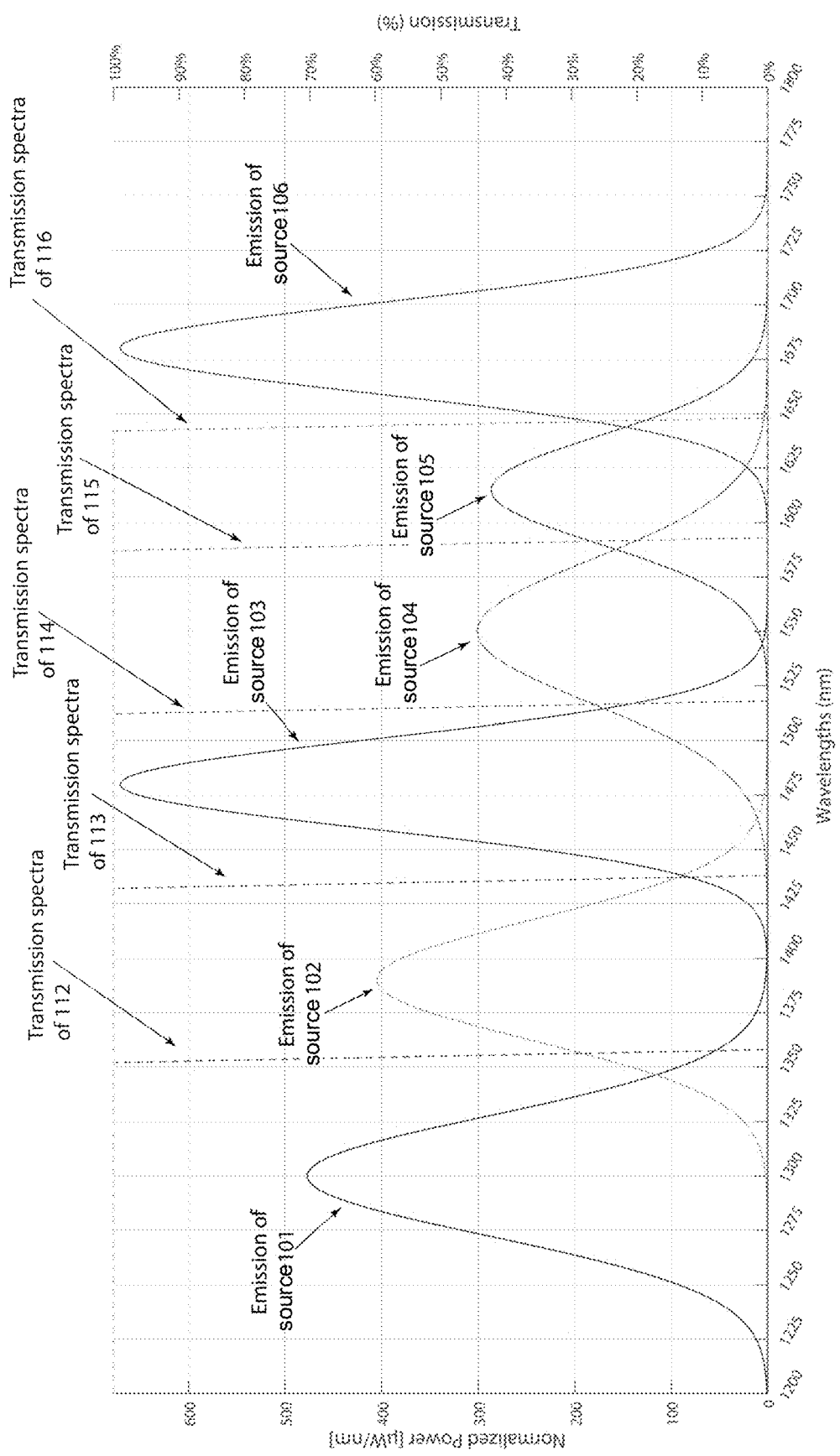
FIG. 2 illustrates the spectrum emitted by each light source and the transmission spectra of each corresponding mirror that is used for alignment of the optical light source outputs into a single beam according to an exemplary embodiment.

In some embodiments, each light source 101-106 emits a beam of light with a different spectrum as shown in FIG. 2. The light sources 101-106 are arranged in a series going from the first light source 101 to the sixth light source 106. The mirror 111-116 paired with a particular light source 101-106 is selected with reflection and transmission properties sufficient to reflect the spectra of the beam of light from the particular light source 101-106 and pass the vast majority of the combined beam of light received from previous light sources 101-106 (if any) in the series. In this way, each of the mirrors 111-116 has a different reflection and transmission properties as shown in FIG. 2.

For instance, a first mirror 111 is a mirror that reflects the whole spectrum (for example a gold plated mirror), including the light emitted by the first light source 101. The second mirror however is a dichroic mirror 112, it has a reflection property sufficient to reflect the majority of light received from the second light source 102 and has a transmission property sufficient to pass the majority of light received from the first mirror 111 (i.e., the light beam originating from the first light source 101), as shown in FIG. 2. In general, each of the second and above mirrors 112-116 is a dichroic mirror that has a reflection property configured to reflect the center of the emission spectrum from its paired light source 102-106 and to pass through the majority of light from previous light sources 101-106. In this way, the combined light beam 134 at the coupling lens 130 includes the light from each of the light sources 101-106.

Since there are no other beams of light from other light sources that are received by the first mirror 111, there are no transmission properties required for the first mirror 111 in this embodiment and the first mirror 111 may be a dichroic or a non-dichroic mirror in alternate embodiments. In yet other embodiments, the first mirror 111 may be omitted and the beam of light emitted by the first light source 101 and the first collimating lens 121 may be directly directed into a rear-facing side of the second dichroic mirror 112.

Figure 3:
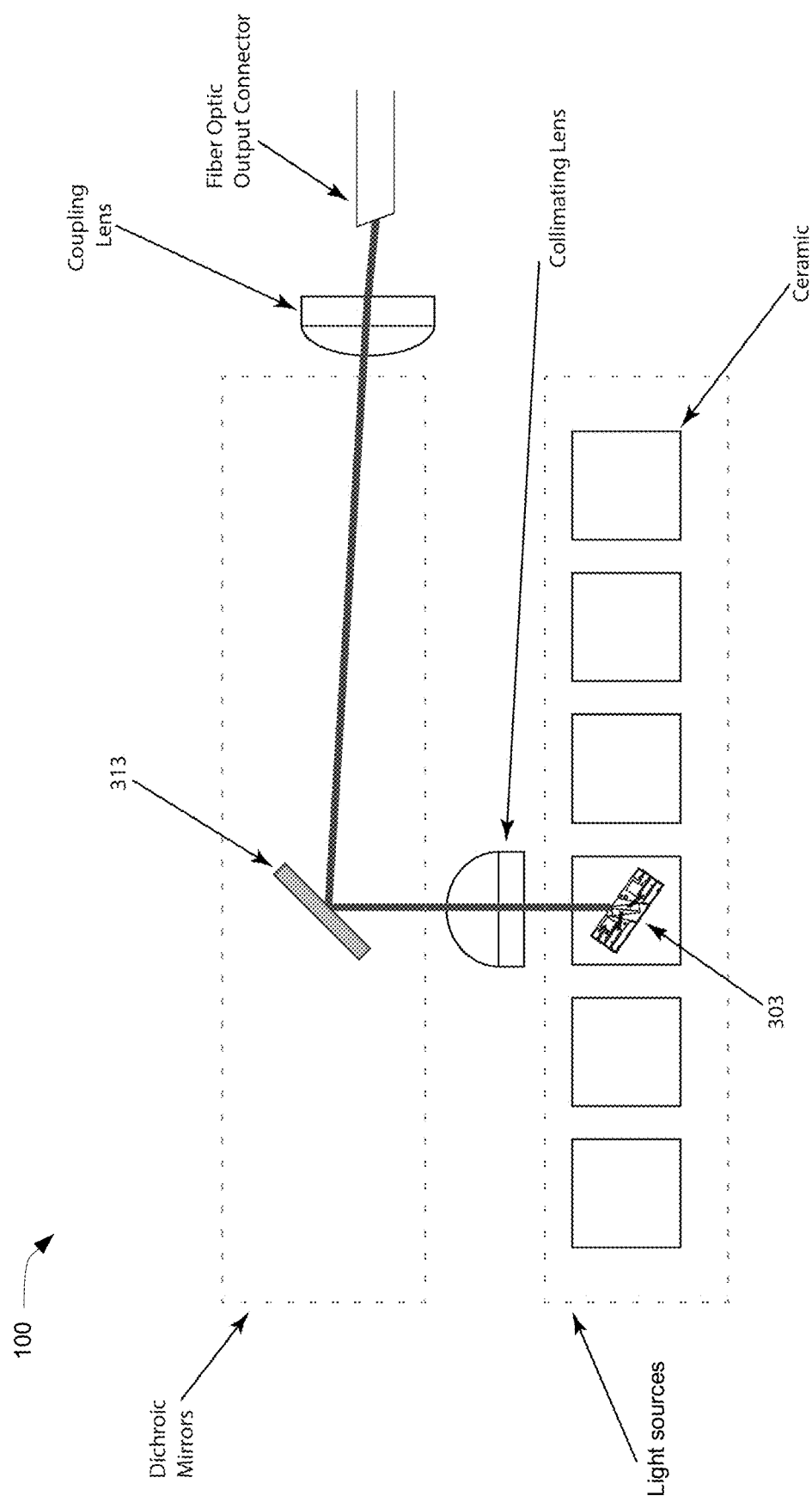
FIG. 3 illustrates a single light source installed into an optical package according to an exemplary embodiment.
Figure 4:
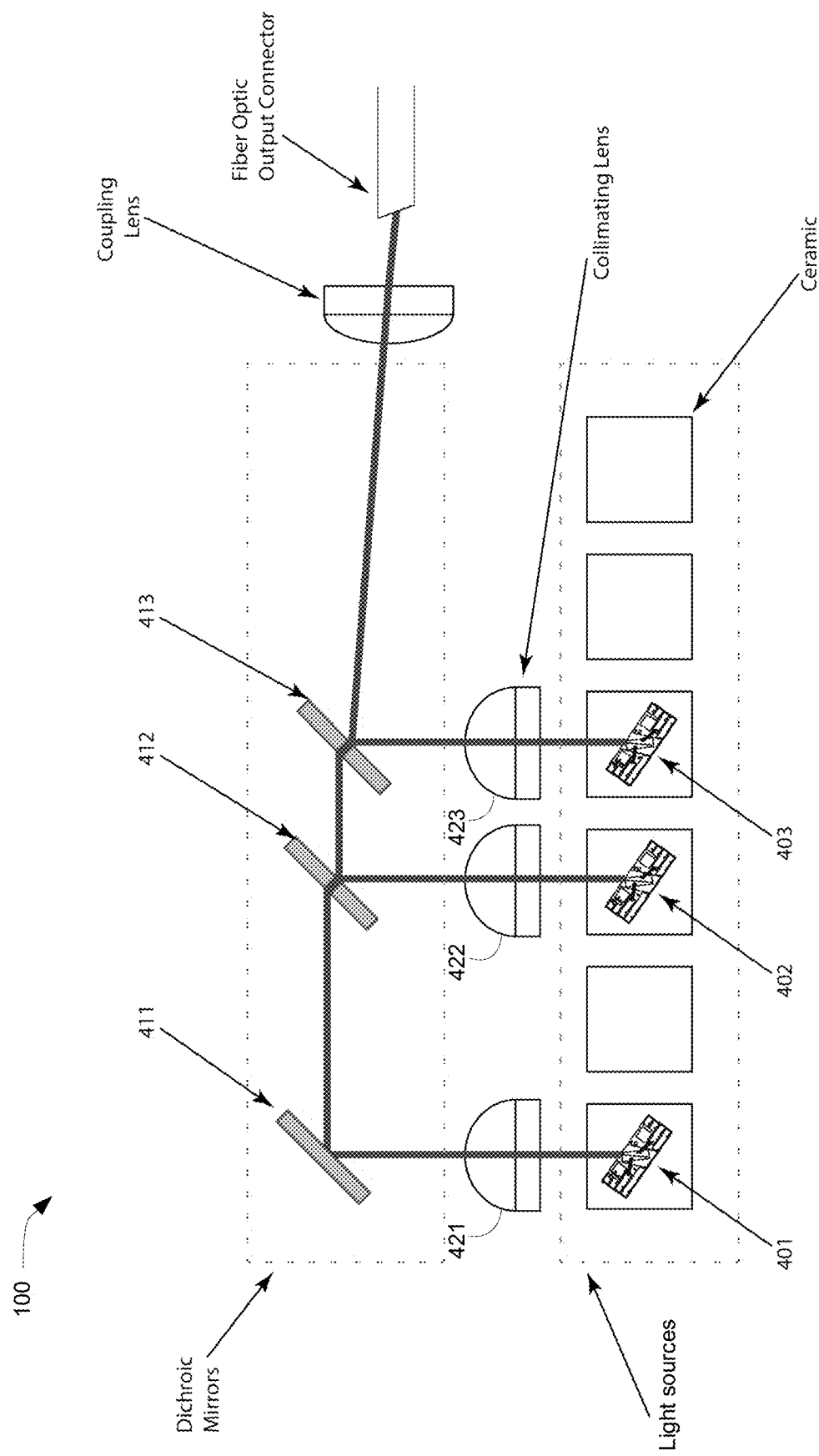
FIG. 4 illustrates a combination of different light sources installed into an optical package according to an exemplary embodiment.
Figure 5:
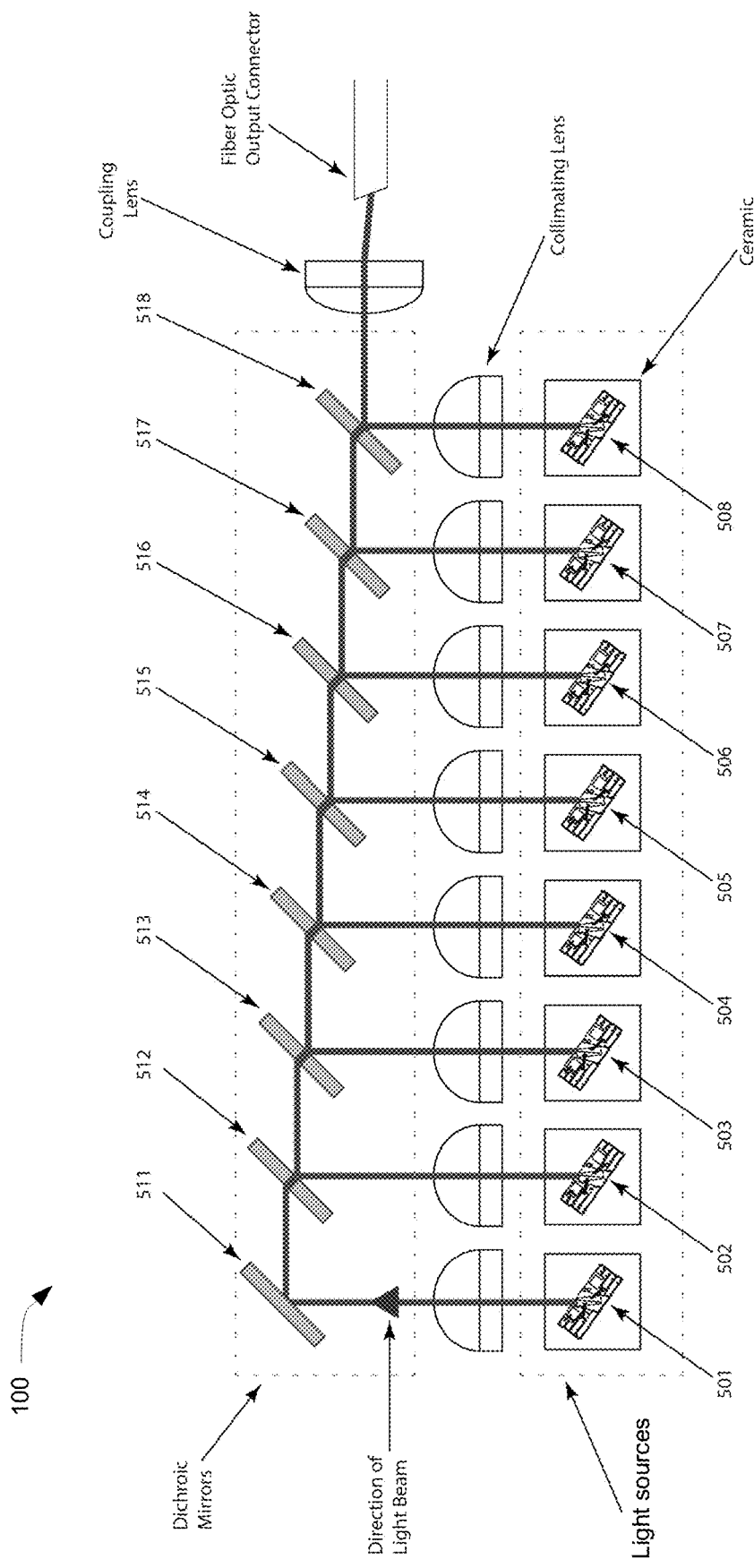
FIG. 5 illustrates a package with an increased number of light sources according to an exemplary embodiment.
Figure 6:
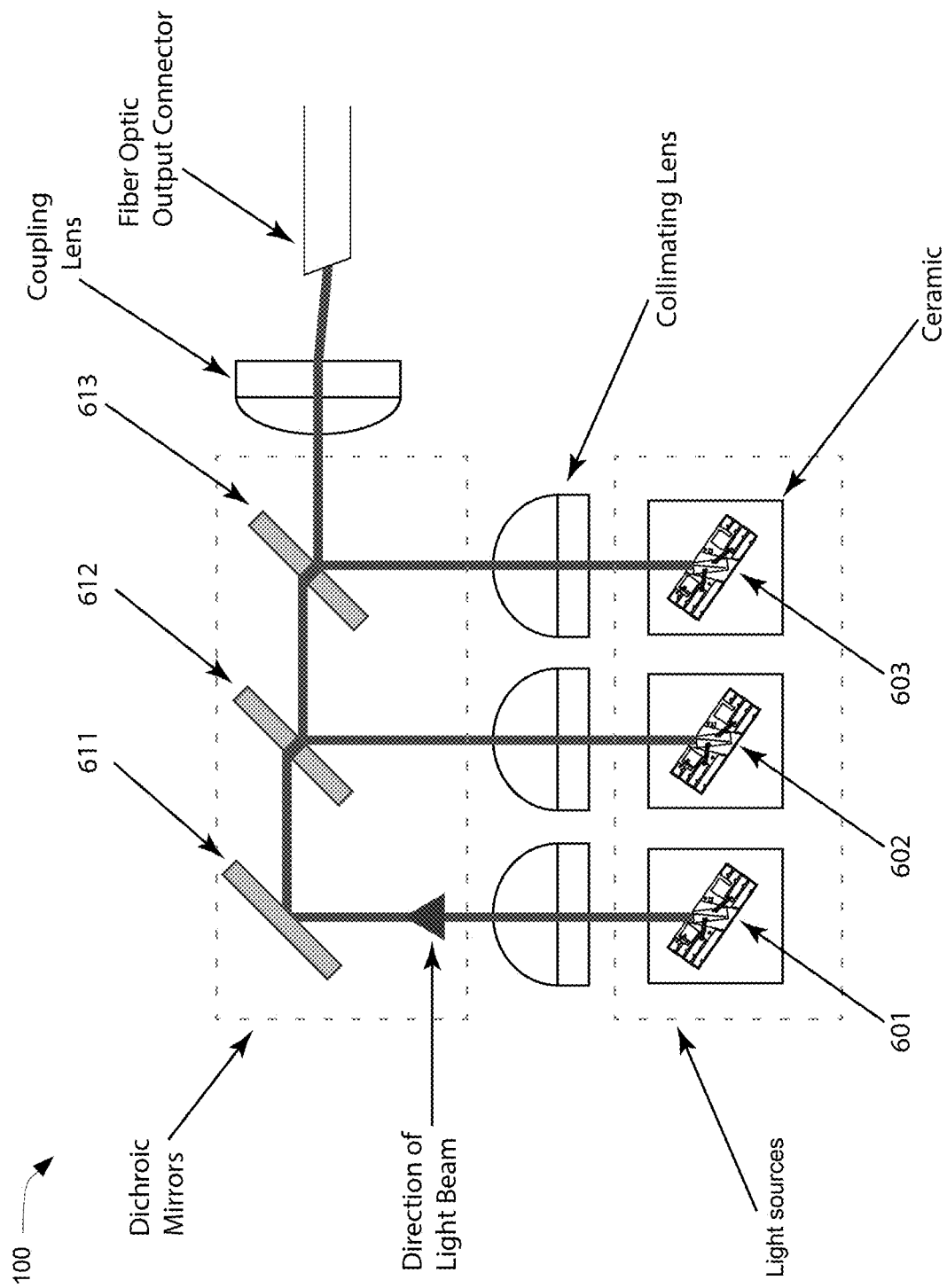
FIG. 6 illustrates a package with a decreased number of light sources according to an exemplary embodiment.

In yet other embodiments, not all of the light sources 101-106 may be present, or more than six light sources 101-106 may be present. The device 100 is capable of working with as little as one light source 101, any single light source 103 may be individually installed inside a butterfly package for the light source module 100 and working in conjunction with a paired mirror 313, as shown in FIG. 3. Removing light sources 101-106 also involves removing other optical components that are no longer needed such as the collimating lenses 121-126 and the dichroic mirrors 111-112. Subsequently in yet other embodiments, any combination of light sources 101-106 may be installed inside the butterfly package, for instance, a combination of three light sources 401, 402 and 403 is shown in FIG. 4. As before, removing light sources 401-403 also involves removing other optical components that are no longer needed, such as the collimating lenses 421-423 and the dichroic mirrors 411-413. Subsequently in yet another embodiment, the size of the butterfly package may be increased as shown in FIG. 5 or decreased as shown in FIG. 6 to hold a larger or smaller number of light sources.

In some embodiments, the various components such as the light sources 101-106, mirrors 111-116, and collimating lens 121-126 are removable and insertable such that they may be dynamically removed and added by users to reconfigure the light source module 100 on the fly such as to change the spectral range and or intensity of the final combined light beam 134 for different applications.

In the layout of components shown in FIG. 1 and FIG. 4 each of the dichroic mirrors 111-116 effectively has a rear-facing side and a front-facing side. The rear-facing side is the side onto which the light beam from previous light sources 101-106 in the series impacts and enters the mirror for transmission through the mirror. The front-facing side is the side from which the light beam from the previous light sources 101-106 in the series exits the mirror and is directed toward a next dichroic mirror or the output fiber optic. The front-facing side is also the side onto which light at wavelengths to be reflected from a next light source 101-106 in the series is directed for being combined with the outgoing light beam. The light beam from the next light source is reflected off the front-facing side due to the dichroic coating on the mirror and joins with the light beam from the previous light sources 101-106 in the series. The term rear-facing indicates the direction that is opposite the direction of the beam of light from the previous light sources in the series and the term front-facing indicates the direction in which the beam of light from the previous light sources exits the dichroic mirror. In general, the combined light beam 134 builds up and travels from the rear-most light source 101 in the series until being emitted out of the front-facing side of the front-most dichroic mirror 116 in the series.

The light sources 101-106 and the dichroic mirrors 111-116 are positioned relative to each other in such a way that a previous beam of light from a previous light source 101-106 is emitted from the front-facing side of a previous dichroic mirror 111-116 and directed to the rear-facing side of a subsequent dichroic mirror 111-116 in the series. If there is no previous light source, as in the case of the first light source 101, the beam of light from the first light source 101 is reflected to the next dichroic mirror from the front-facing side of the first dichroic mirror 111 only. Or alternatively for the first light source 101, a fully reflective first mirror 111 in the series is used such as a gold coated mirror.

Taking the second dichroic mirror 112 as an example of a subsequent mirror, the previous beam of light 150 enters the rear-facing side of the subsequent (i.e., second) dichroic mirror 112 and passes through the subsequent dichroic mirror 112 exiting on the front-facing side of the subsequent dichroic mirror 112. The beam of light 152 from the subsequent (i.e., second) light source 102 is reflected from the front-facing side of the subsequent dichroic mirror 112 in the same direction that the previous beam of light 152 exited the front-facing side of the subsequent dichroic mirror 112. The previous beam of light 150 and the subsequent beam of light 152 are combined and aligned to overlay in space therefore each beam 150, 152 contributes their spectra to the emission beam 154, as shown in FIG. 1 and FIG. 3 to FIG. 6. The process is repeated for each pair of light source 103-106 and corresponding dichroic mirror 113-116 in the series. Exiting the final dichroic mirror 116, the fully combined light beam 134 then enters the coupling lens 130, which couples the light beam 134 into the output fiber optic 132.

Figure 7:
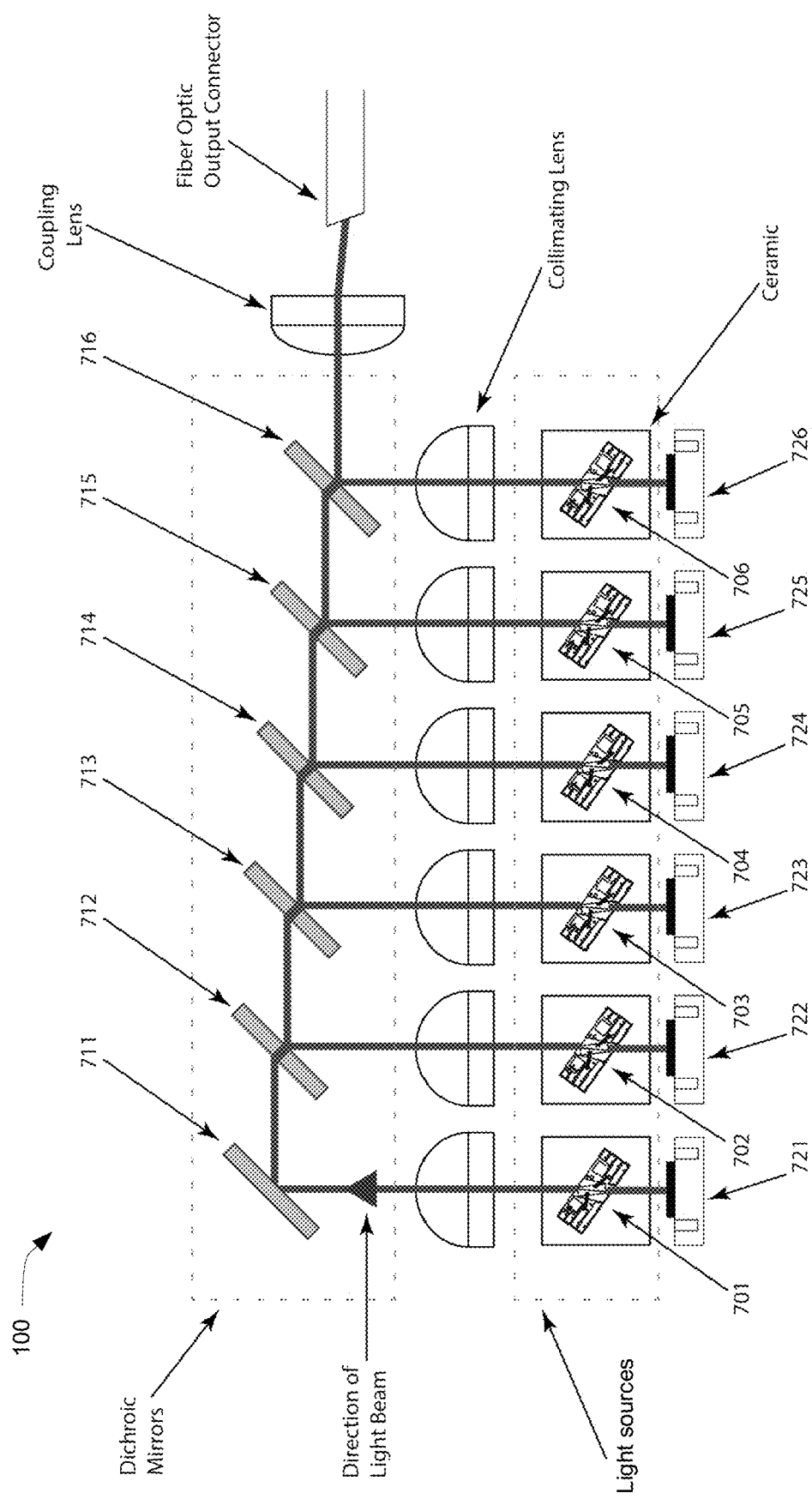
FIG. 7 illustrates a package with monitoring photodiodes to monitor individual optical output from each light source according to an exemplary embodiment.

FIG. 7 shows the schematic arrangement of monitoring photodiodes (MPDs) 721-726 placed behind their corresponding light sources 701-706 to monitor the optical output power from each individual light source 701-706. In some embodiments, the light source module 100 includes monitoring photodiodes 721-726 for the light sources 701-706. Part of the emission from a light source 701-706 is emitted from the back facet, by placing a photodiode 721-726 at the back of the light source 701-706, it is possible to monitor the emission power from the photodiode 721-726, which is an indicator for the optical power stability and general system's health.

Figure 8:
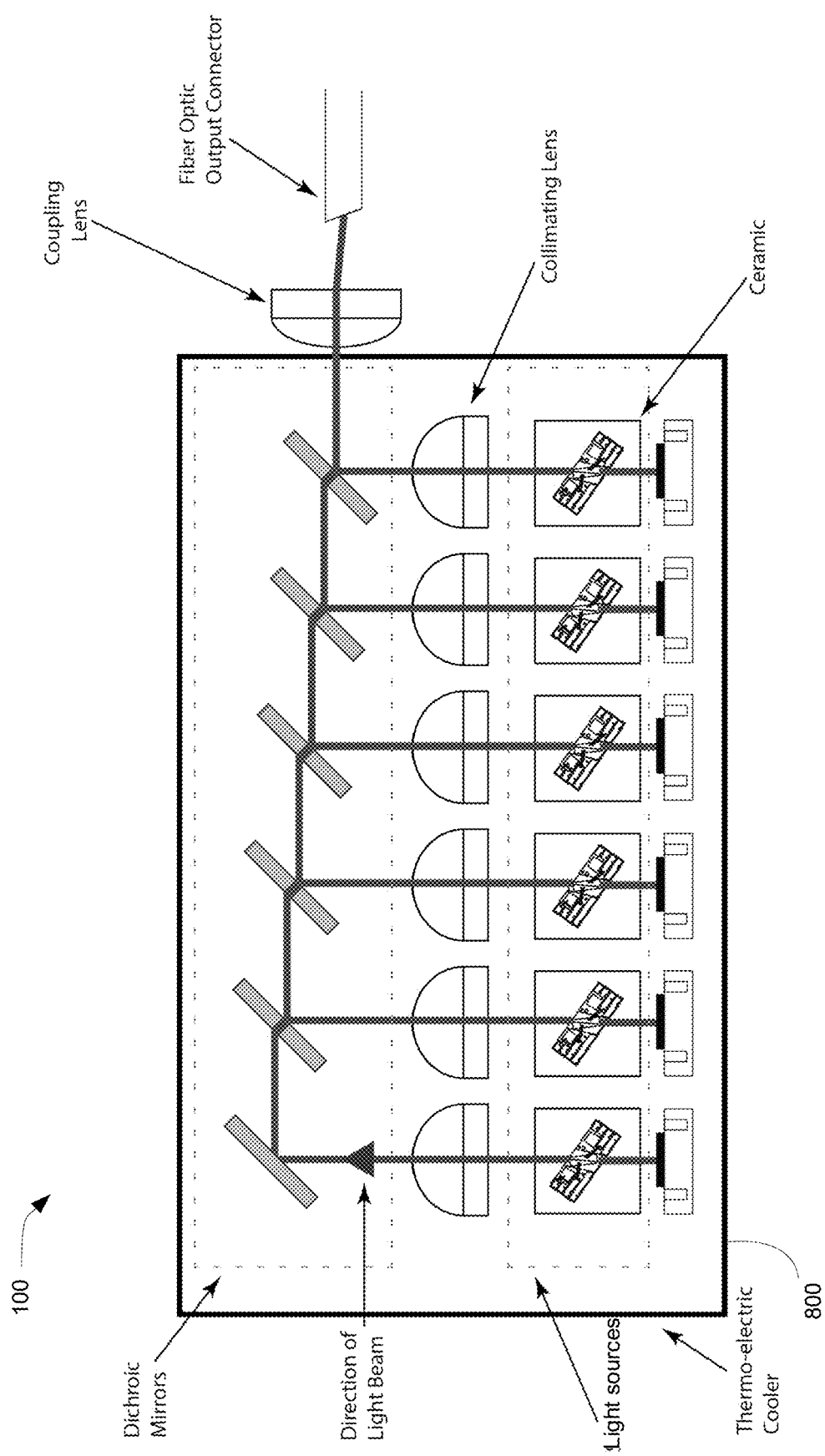
FIG. 8 illustrates a package that includes a thermo-electric cooling device to transfer heat generated by the optical elements outside of the butterfly package according to an exemplary embodiment.

FIG. 8 shows an exemplary embodiment that includes all optical elements coupled on to a thermo-electric cooling (TEC) 800. In some embodiments, the light source module 100 includes a thermo-electric cooling (TEC) 800 device at the bottom. Where the optical elements are attached (though not necessarily directly, but by the use of intermediate holder such as an optical bench) on top of the TEC 800. During their operation, light sources may generate excessive heat and coupling them to a TEC device 800 allows transferring that heat outside of the optical butterfly package.

Figure 9:
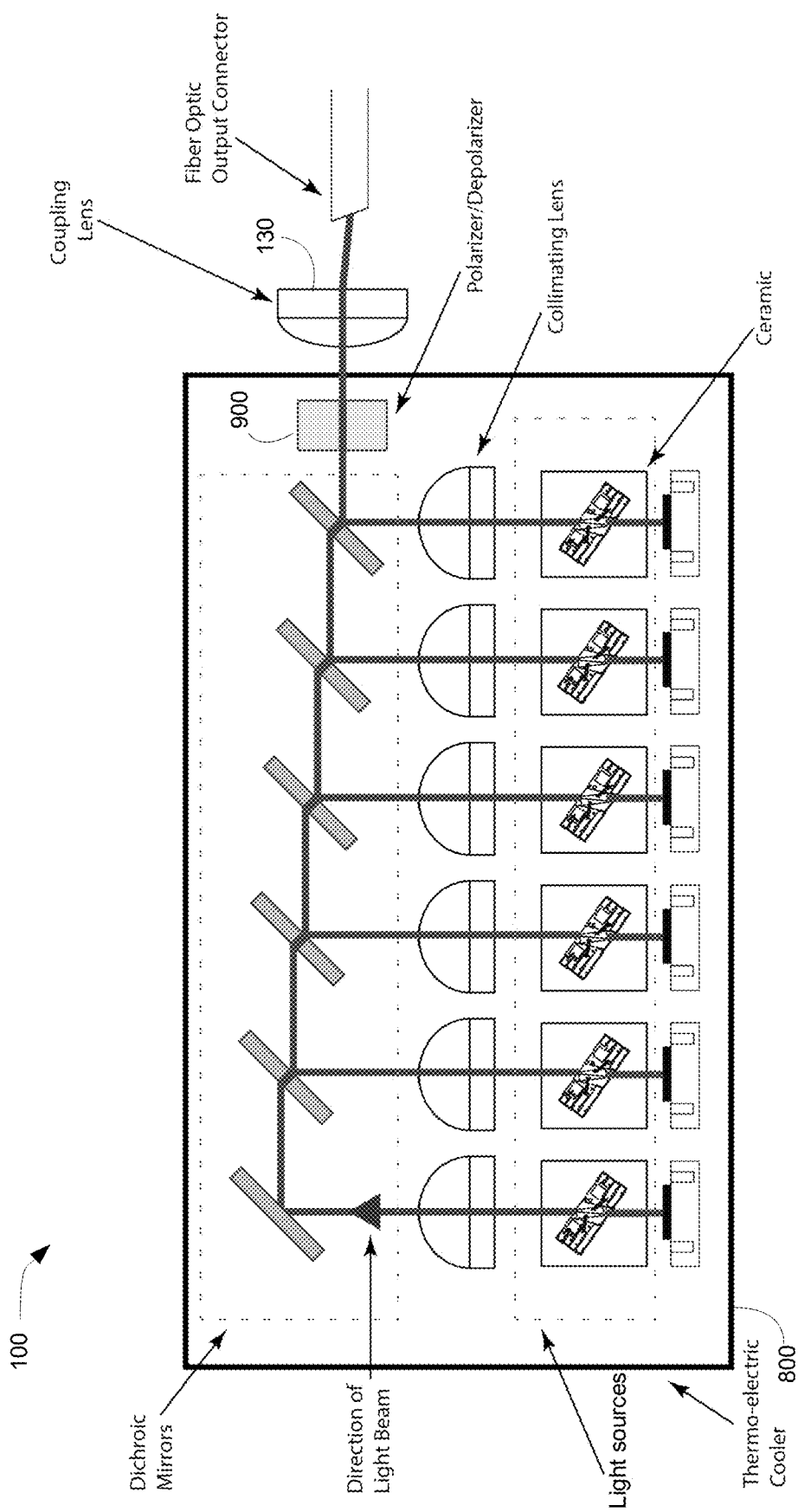
FIG. 9 illustrates a package that includes a thermo-electric cooling device, monitoring photodiodes and either a polarizer or a depolarizer that either polarizes or depolarizes the beam before it is coupled into the single mode polarization maintaining output fiber according to an exemplary embodiment.

FIG. 9 shows an exemplary embodiment that includes all optical elements coupled on to a TEC 800 with an optional polarization adjustment device 900 such as a polarizer or depolarizer placed in front of the coupling lens 130. In some embodiments, the light source module 100 includes a polarizer or depolarizer to polarize or depolarize the beam before it is coupled into the single mode polarization maintaining output fiber.

Figure 10:
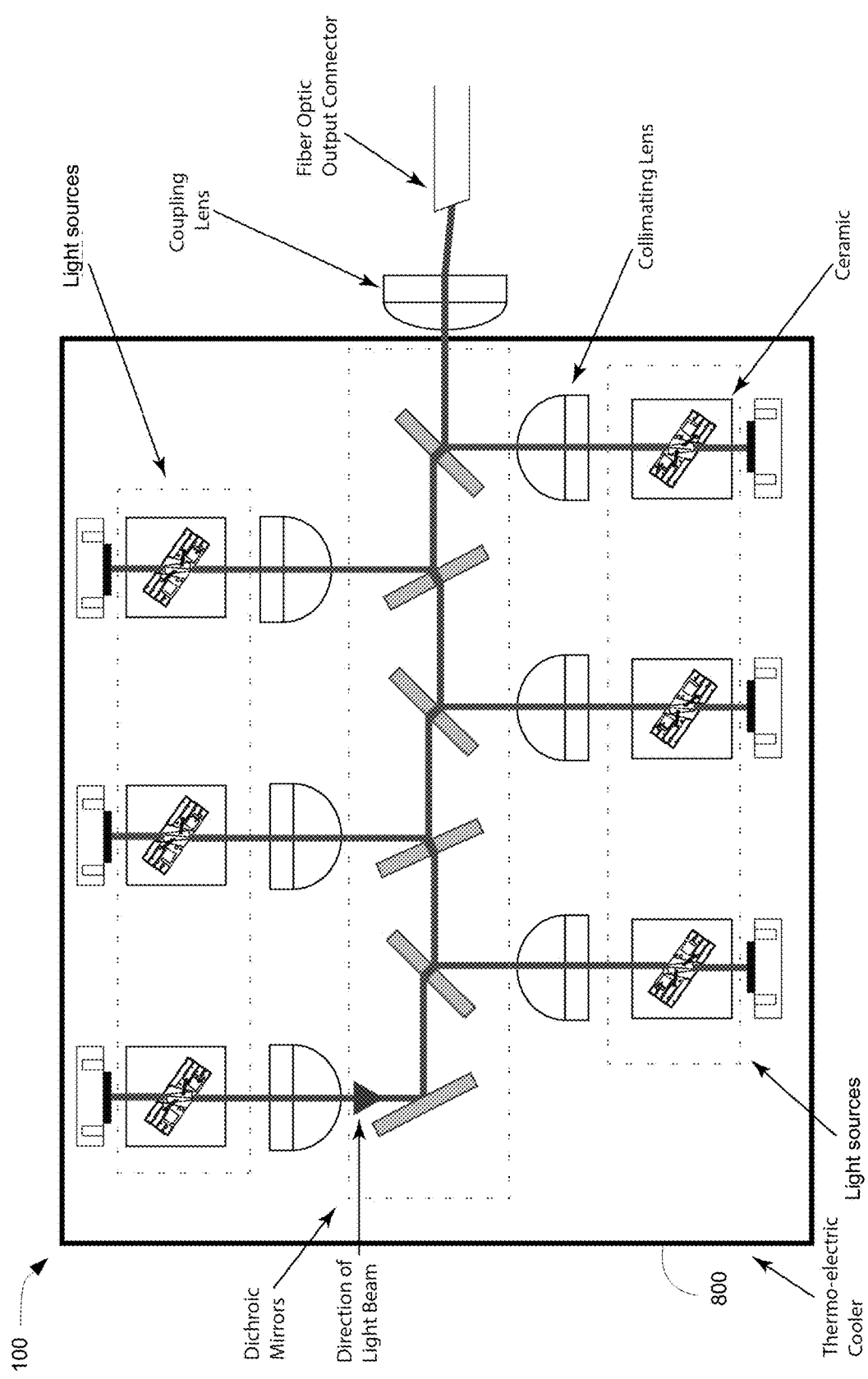
FIG. 10 illustrates a package that includes a thermo-electric cooling device, with the physical arrangement of the optical components alternating sides such that every other light source and its corresponding optical components are located on opposite sides according to an exemplary embodiment.

FIG. 10 shows an exemplary embodiment that includes all optical elements coupled on to a TEC 800, however every other light source and their corresponding optical components are located on opposite sides. In some embodiments, the arrangement of the optical elements is changed to such that the light sources 101-106 and their associated collimating lenses 121-126 alternate physical sides in the series and therefore occupy both sides of an enclosure being an optical butterfly package. The change in arrangement of optical elements does not affect the methodology or the concept of operation of the light source device 100.

In some embodiments, the narrow band spectral outputs of one or more laser diodes may be combined with the broadband spectral outputs of one or more SLEDs. Likewise, spectral outputs of single mode light sources may be combined with multimode light sources.

Figure 11:
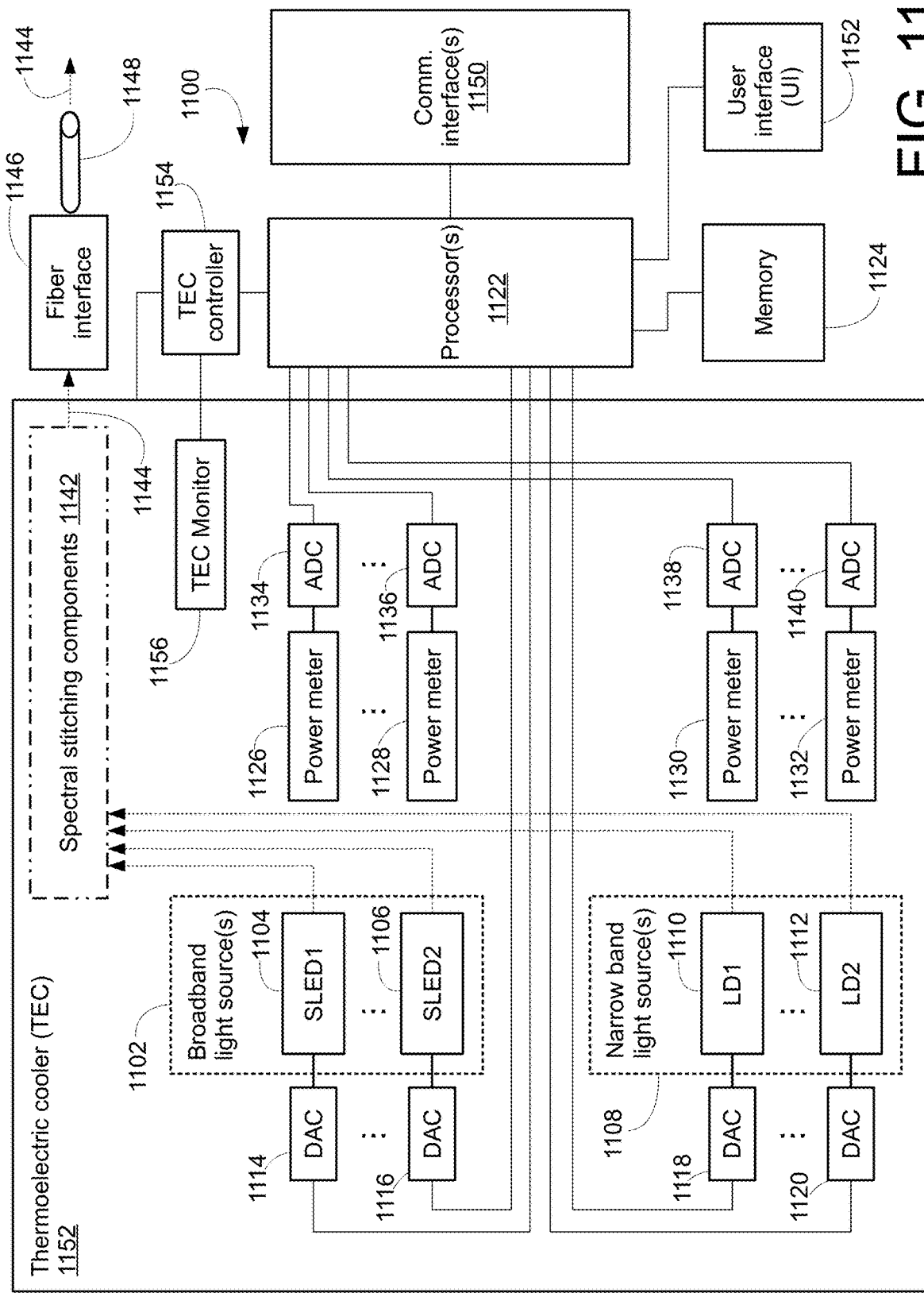
FIG. 11 illustrates a block diagram of a broadband light source module that combines spectrums of different types of light sources according to an exemplary embodiment of the invention.

FIG. 11 illustrates a block diagram of a broadband light source module 1100 that combines spectrums of different types of light sources 1102, 1108 according to an exemplary embodiment of the invention. The light source module 1100 includes a plurality of broadband light sources 1102 including SLEDs 1104, 1106. The light source module 1100 further includes a plurality of narrow band light sources 1108 including laser diodes 1110, 1112. Other types of semiconductor light sources may also be combined in a similar manner such as LED light sources. The various light sources of different types 1102, 1108 are each coupled to and controlled by analog signals outputted by one of a plurality of digital-to-analog converters (DACs) 1116, 1118, 1120, 1222. The DACs 1116, 1118, 1120, 1222 in turn are controlled according to digital signals outputted by one or more processors 1122.

The processors 1122 may execute instructions stored in a memory 1124 such as a FLASH memory. In some embodiments the processors 1122 include multiple processors 1122 (sometimes also referred to as cores) of an embedded central processing unit (CPU) of a microcontroller; however, it is to be understood that a single processor 1122 may also be configured to perform the described functionality in other implementations. Likewise, in some embodiments, the processor 1122 and memory 1124 are implemented by a field programable gate array (FPGA) or other components such as an application specific integrated circuit (ASIC).

The light source module 1100 further includes a plurality of power meters 1126, 1128, 1130, 1132 each respectively for monitoring the power output of one of the light sources 1104, 1106, 1110, 1112. The signals measured by the power meters 1126, 1128, 1130, 1132 are converted to digital by analog-to-digital converts (ADCs) and sent to the processor 1122. The processor 1122 uses these inputs in order to adjust and control to the DACs 1114, 1116, 1118, 1120 as appropriate so that each light source 1104, 1106, 1110, 1112 operates at a desired power level. In some embodiments, the processor 1122 in combination with the above control and monitoring devices (e.g., DACs, Power meters, ADC) perform current control of the light sources 1104, 1106, 1110, 1112 via analog feedback in order to stabilize the spectral output of each light source 1104, 1106, 1110, 1112.

Figure 12:
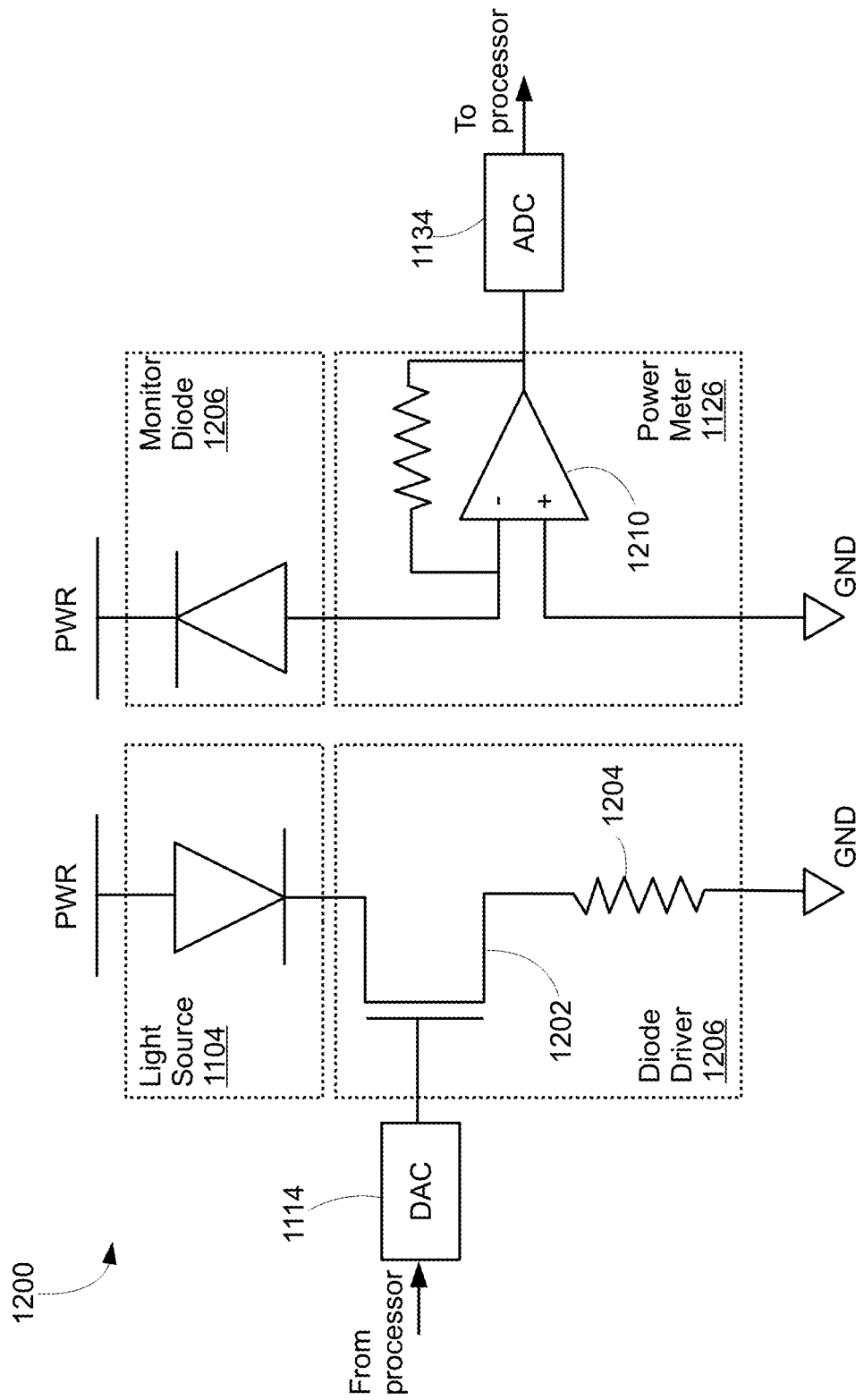
FIG. 12 illustrates circuitry for driving the first light source shown in FIG. 11 and monitoring power output therefrom according to an exemplary embodiment.

Taking the first SLED 1104 as an example, the processor 1122 transmits an initial value to the first DAC 1114 where the initial value is converted to an analog signal representing current witch which the first SLED 1104 is driven (by a driver circuit 1206—see FIG. 12 for more details). Light from the first SLED 1104 is detected by the power meter 1126 and an analog signal outputted thereby is converted into the digital domain by the first ADC 1134 for transmission to the processor 1122. Depending on the received power value, the processor 1122 can thereby adjust the signal sent to the first DAC 1114 in order to optimize and stabilize the power output of the first SLED 1104. A similar process is used to set and maintain the stability of each of the different types of light sources 1104, 1106, 1110, 1112 by the processor 1122.

As illustrated in FIG. 11, the broadband light source module 1100 further includes a plurality of spectral stitching components 1142 such as the collimating lenses 121-126, dichroic mirrors 111-116, and coupling lens 130 organized in one of the physical layouts as illustrated as illustrated in FIG. 1 to FIG. 10. Although, the spectral stitching components 1142 are not electrical components, they are still shown on the block diagram FIG. 11 for convenience of description. In general, the spectral stitching components 1142 act to merge and combine the spectral wavelengths outputted by the various light sources 1104, 1106, 1110, 1112 of different types 1102, 1108 in order to form a combined beam 1144. The combined beam 1144 is passed to a fiber optic output interface 1146 for output to a connected fiber optic cable 1148.

The light source module 1100 further includes one or more communications interfaces 1150 that allow the processor 1122 to communicate with the external digital components. Examples of communications interfaces 1122 that may be included on the light source module 1100 include serial and parallel ports and their associated driver chips such as universal serial bus (USB) transceivers, wireless transceivers such as Wi-Fi and/or Bluetooth radio transceivers. User interface (UI) devices 1152 such as liquid crystal display (LCD) screens or light emitting diodes (LEDs) for outputting status information to the user may also be provided. The UI devices 1152 may also include one or more buttons or switches to activate and disable generation of the light source signals by the processor 1122 or to switch operating modes. For instance, a switch may allow the user to configure the processor 1122 to change the output power of one or more of the light sources 1104, 1106, 1110, 1112. Likewise, a switch may allow the user to cause the processor 1122 to disable and/or activate one of specific light sources 1104, 1106, 1110, 1112 in order to thereby change the spectral composition of the combined beam 1144 according to user input. Examples of modes that may also be controlled by the processor 1122 and optionally under user control include pulsing different light sources 1104, 1106, 1110, 1112 on and off in predetermined orders and for predetermined time periods/frequencies such that the combined beam has spectral components that dynamically change temporally over time.

The broadband light source module 1100 further includes a thermoelectric cooler (TEC) 1152 on which the various light sources 1104, 1106, 1110, 1112 and spectral stitching components 1142 are installed. The TEC 1152 is controlled by signals outputted by a TEC controller 1154, which in turn is monitored and controlled by the processor 1122. The TEC controller 1154 sends signals to the TEC 1150 in order to control temperature of the TEC 1150. The TEC controller 1154 further receives feedback signals from a TEC monitor 1156 such as a thermistor and can therefore stabilize and maintain the temperature of the optical and electrical components mounted on the TEC 1152.

FIG. 12 illustrates circuitry 1200 for driving the first light source 1104 shown in FIG. 11 and monitoring power output therefrom according to an exemplary embodiment. Although this example utilizes the first SLED 1104 of FIG. 11 as an example, it is to be understood that a similar circuit 1200 is also employed for each of the various light sources 1104, 1106, 1110, 1112. The first light source 1104 is a semiconductor device being a diode through which current passes from a power source PWR. The amount is current is controlled by a transistor 1202, which is driven by the analog output of the DAC 1114 under control of the processor 1122. A sensing resistor 1204 is coupled between the transistor 1202 and ground GND. The transistor 1202 and sense resister 1204 together act as a diode driver 1206 allowing the processor 1122 to control the power output of the light source 1104.

To monitor the power output, a monitoring diode 1208 is placed adjacent to the light source 1104 and receives light from the light source 1104. The power meter 1126 includes a transimpedance amplifier (TIA) 1210 to convert the amount of current passed by the monitor diode 1208 into a voltage value. The ADC 1134 converts the voltage value into digital for the processor 1122. The processor 1122 can thereby monitor the output power of the light source 1104 via the power meter 1126 formed by monitor diode 1206 and TIA amplifier 1210.

Because each light source 1104, 1106, 1110, 1112 is individually monitored and controlled by the processor 1122 using a dedicated power meter 1126 and light source driver 1206, the light source module 1100 is able to integrate and combine light sources of different types in a manner to form a combined beam 1144 of desired intensity and spectral range.

In an exemplary embodiment, a wide band light source 100 includes multiple superluminescent diode (SLED) sources 101-106 enclosed within a butterfly package. The butterfly package includes a plurality of SLEDs 101-106, the emitted light from each SLEDs 101-106 is collimated via a collimating lens 121-126 and directed towards the output optical fiber using a mirror 111-116. Each SLED 101-106 produces light in a different spectral range, the collimated beams from the various SLEDs 101-106 are combined into a joined broadband beam 134 by a plurality of corresponding dichroic mirrors 111-116. The broadband beam 134 is coupled into a single mode polarization maintain fiber which serves as the optical output 132 from the butterfly package. Other types of semiconductor light sources such as laser diodes and LEDs may be included in the butterfly package and contribute to the broadband beam 134 in a similar manner.

In an exemplary embodiment, a wideband light source 1100 includes multiple light sources 1104, 1106, 1110, 1112 of different types enclosed within a butterfly package. The butterfly package includes one or more light sources 1104, 1106 of a first type 1102 and one or more light sources 1110, 1112 of a second type 1104. The emitted light from each of the light sources 1104, 1106, 1110, 1112 is collimated via a collimating lens 121-126 and directed towards the output optical fiber 1144 using a mirror 111-116. Each light source 1104, 1106, 1110, 1112 produces light in a different spectral range, the collimated beams from the various light sources 1104, 1106, 1110, 1112 are combined into a combined beam 1144 by a plurality of corresponding dichroic mirrors 111-116 and other spectral stitching components 1142. The combined beam 1144 is coupled into an optical output 1146 from the butterfly package. Power output is controlled and monitored for each light source by a processor 1122.

In an exemplary embodiment, a wideband light source 1100 includes multiple light sources 1104, 1106, 1110, 1112 enclosed within a butterfly package. The butterfly package includes light sources of different types 1102, 1108 such as a plurality of SLEDs 1104, 1106 and a plurality of laser diodes 1110, 1112. Other types of broadband and narrow band light sources 1102, 1108 may be included on the same butterfly package in a similar manner. The emitted light from each light source 1104, 1106, 1110, 1112 is collimated via a collimating lens 121-126 and directed towards an optical fiber 1148 using a mirror 111-116. Each light source 1104, 1106, 1110, 1112 produces light in a different spectral range, and the collimated beams from the various light sources 1104, 1106, 1110, 1112 are combined into combined beam 1144 by a plurality of corresponding dichroic mirrors and other spectral stitching components 1142. The combined beam 1144 is coupled into a single mode or polarization maintaining fiber 1146, 1148 which serves as the optical output from the butterfly package. A processor 1122 monitors the power output of each light source 1104, 1106, 1110, 1112 and drives each light source 1104, 1106, 1110, 1112 to ensure stability.

Although the invention has been described in connection with preferred embodiments, it should be understood that various modifications, additions and alterations may be made to the invention by one skilled in the art without departing from the spirit and scope of the invention. For example, although the above description has focused on a butterfly package, a similar light source module 100 can also be designed in other package types and sizes.

The above control functionality of the light sources, power meters, and TEC board may be implemented by software executed by one or more processors operating pursuant to instructions stored on a tangible computer-readable medium such as a storage device to perform the above-described functions of any or all aspects of the access controller. Examples of the tangible com-puter-readable medium include optical media (e.g., CD-ROM, DVD discs), magnetic media (e.g., hard drives, diskettes), and other electronically readable media such as flash storage devices and memory devices (e.g., RAM, ROM). The computer-readable medium may be local to the computer executing the instructions, or may be remote to this computer such as when coupled to the computer via a computer network such as the Internet. The processors may be included in a general-purpose or specific-purpose computer that becomes the processor and/or TEC controller of the light source module as a result of executing the instructions.

Although the above embodiments have focused on combining the spectral outputs of a plurality of light sources of different types such as SLEDs, laser diodes, LEDs etc., other embodiments are also possible that include a plurality of a same types of light sources.

In some embodiments, rather than being software executed by one or more processors, the processor and control functionality is implemented as hardware modules configured to perform the above-described functions. Examples of hardware modules include combinations of logic gates, integrated circuits, field programmable gate arrays, and application specific integrated circuits, and other analog and digital circuit designs.

Functions of single units may be separated into multiple units, or the functions of multiple units may be combined into a single unit. All combinations and permutations of the above described features and embodiments may be utilized in conjunction with the invention.

What is claimed is:

1. A light source module comprising:
a plurality of light sources, wherein at least two of the light sources are of different types, a first of the different types being a broadband light source comprising a superluminescent diode (SLED), and a second of the different types being a narrowband light source comprising a laser diode;
one or more mirrors for combining light emitted from each of the light sources into a combined light beam;
an output connector for transmitting the combined light beam to a fiber optic cable;
a processor;
a memory coupled to the processor;

a plurality of light source drivers coupled to the processor, each of the light sources being driven by a respective one of the light source drivers; and a plurality of power meters coupled to the processor, each of the light sources being monitored by a respective one of the power meters;

wherein, by executing one or more instructions stored in the memory, the processor is configured to monitor an output power of each of the light sources according to a plurality of monitored power signals received from the power meters, and to dynamically generate a plurality of power signals to control the output power of each of the light sources to change the light intensity and spectral ranges according to the monitored power signals and one of a plurality of different modes of operation.

2. The light source module of claim 1, wherein each of light sources emits light with a unique spectrum in a different spectral region from others of the light sources.

3. The light source module of claim 1, wherein:
the plurality of light sources includes at least a first light source and a second light source;
the one or more mirrors include at least a dichroic mirror having a rear-facing side and a front-facing side;
the first light source, the second light source, and the dichroic mirror are positioned relative to each other such that a first beam of light originating from the first light source enters the rear-facing side of the dichroic mirror and passes through the dichroic mirror exiting on the front-facing side of the dichroic mirror; and
a second beam of light from the second light source is reflected from the front-facing side of the dichroic mirror in a same direction that the first beam of light exists the front-facing side of the dichroic mirror;
whereby the first beam of light and the second beam of light are overlaid and combined into a single beam.

4. The light source module of claim 3, wherein:
the plurality of light sources includes one or more additional light sources in addition to the first light source and the second light source;
the plurality of light sources are arranged in a series having a sequential order;
each of the additional light sources are paired with a respective dichroic mirror;
each respective dichroic mirror receives on a rear-facing side a first incoming light beam that contains light from prior light sources in the series and receives on a front-facing side a second incoming light beam that contains light from a corresponding one of the light sources with which the respective dichroic mirror is paired, wherein a reflected version of the second incoming light beam is in a same direction that the first incoming light beam exists the front-facing side of the respective dichroic mirror; whereby the first incoming light beam and the second incoming light beam are overlaid and combined into a single outgoing light beam that is directed to a next respective dichroic mirror in the series until a last respective dichroic mirror directs its outgoing light beam for output by the output connector; and
the light source module further comprising a plurality of collimating lenses, each respective one of the collimating lenses being positioned intermediate each of the light sources and a respective mirror with the light source is paired.

5. The light source module of claim 4, wherein each respective dichroic mirror has:

a transmission property sufficient to pass a majority of light in a prior combined light beam spectrum from all prior light sources in the series; and
a reflection property to reflect a majority of light in an emission spectrum from a one of light sources with which the respective dichroic mirror is paired.

6. The light source module of claim 1, wherein, in different modes of operation, the processor is configured to change which of the light sources are activated such that the combined beam has different spectral components in different modes of operation.

7. The light source module of claim 1, wherein, in at least one of the different modes of operation, the processor is configured to pulse different ones of the light sources on and off such that the combined beam has spectral components that dynamically change temporally over time.

8. The light source module of claim 7, wherein the processor is configured to pulse different ones of the light sources on and off in a predetermined order.

9. The light source module of claim 7, wherein the processor is configured to pulse different ones of the light sources on and off for predetermined time periods.

10. The light source module of claim 7, wherein the processor is configured to pulse different ones of the light sources on and off with predetermined frequencies.

11. The light source module of claim 1, wherein the processor is further configured to change the output power of one or more of the light sources.

12. The light source module of claim 1, wherein the processor is further configured to change between different modes of operation, wherein different modes involve the processor controlling the light sources such that the combined beam has different spectral components.

13. The light source module of claim 1, further comprising a wireless communications interface coupled to the processor, the wireless communications interface allowing the processor to wirelessly communicate with one or more external components.

14. The light source module of claim 1, further comprising:
a user interface device coupled to the processor, the user interface device allowing the processor to receive a user input from a user of the light source module;
wherein the processor is configured to change which of the light sources are activated according to the user input received via the user interface device.

15. The light source module of claim 14, wherein the processor is further configured to change the output power of one or more of the light sources according to user input received via the user interface device.

16. The light source module of claim 15, wherein the processor is further configured to change between different modes of operation according to the user input received via the user interface.

17. The light source module of claim 15, wherein the user interface device comprises one or more buttons or switches.

18. The light source module of claim 1, wherein the light sources are removable and insertable such that they may be dynamically removed and added by a user to reconfigure the light source module to change a spectral range and/or intensity of the combined light beam for different applications.

19. The light source module of claim 1, wherein each of the light source drivers is for driving a respective one of the light sources and comprises:

a digital-to-analog converter receiving a digital power signal for the respective one of the light sources from the processor and outputting a corresponding analog control signal;

a transistor for controlling an amount of current flowing between a source and a drain of the transistor according to the corresponding analog control signal received on a gate of the transistor; wherein the source of the transistor is coupled to a first terminal of the respective one of the light sources, and a second terminal of the respective one of the light sources is coupled to a first power supply voltage; and a resistor coupled between the drain of the transistor and a second power supply voltage.

20. The light source module of claim 1, wherein each of the power meters is for monitoring a respective one of the light sources and comprises:

a monitoring diode placed adjacent to and receiving light from the respective one of the light sources, wherein a first terminal of the monitoring diode is coupled to a first power supply voltage;

a transimpedance amplifier having a negative input coupled to a second terminal of the monitoring diode and a positive terminal coupled to a second power supply voltage, the transimpedance amplifier having a resistor coupled between the negative terminal and an output terminal of the transimpedance amplifier, the transimpedance amplifier thereby converting an amount of current passed by the monitoring diode into a voltage outputted on the output terminal; and an analog-to-digital converter coupled to the output terminal of the transimpedance amplifier for converting the voltage into a digital monitored power signal for the processor.

* * * * *